United States Patent [19]

Motoki

[11] Patent Number: 5,124,881
[45] Date of Patent: Jun. 23, 1992

[54] ENCLOSED SWITCHGEAR

[75] Inventor: Hisao Motoki, Iruma, Japan

[73] Assignee: Kabushiki Kaisha Toshiba, Kawasaki, Japan

[21] Appl. No.: 669,062

[22] Filed: Nov. 7, 1984

[30] Foreign Application Priority Data

Nov. 8, 1983 [JP] Japan .................. 58-208206

[51] Int. Cl.$^5$ ............................. H02B 5/00
[52] U.S. Cl. ................... 361/335; 361/341; 361/355; 361/361
[58] Field of Search ............... 361/333, 335, 336, 338, 361/341, 342, 353, 355, 361

[56] References Cited

U.S. PATENT DOCUMENTS

| | | | |
|---|---|---|---|
| 2,345,033 | 3/1944 | Claybourn | 361/341 |
| 3,349,291 | 10/1967 | Olashaw | 361/341 |
| 3,792,315 | 2/1974 | Salvati et al. | 361/335 |
| 3,840,785 | 10/1974 | Olashaw | 361/342 |
| 4,136,374 | 1/1979 | Rosey et al. | 361/342 |
| 4,178,624 | 12/1979 | Wilson et al. | 361/341 |
| 4,242,718 | 12/1980 | Shariff et al. | 361/341 |

FOREIGN PATENT DOCUMENTS

| | | |
|---|---|---|
| 2824023 | 12/1979 | Fed. Rep. of Germany . |
| 54-13945 | 2/1979 | Japan . |
| 0131738 | 10/1979 | Japan ................ 361/334 |

Primary Examiner—Gregory D. Thompson
Attorney, Agent, or Firm—Foley & Lardner

[57] ABSTRACT

An enclosed type switchgear for receiving electric power from two separate power lines includes first and second circuit breaker chambers arranged side by side and a third circuit breaker chamber provided below the first and second circuit breaker chambers. First and second circuit breakers, the power source side terminals of which connected to the power lines are encased in the first and second circuit breaker chambers, respectively, while a third circuit breaker interconnecting the load side terminals of the first and second circuit breakers is encased in the third circuit breaker chamber. Bus chambers are provided on the rear side of the first, second and third circuit breaker chambers, respectively for encasing conductors interconnecting the first, second and third circuit breakers. All of the chambers and the conductors are arranged symmetrically with respect to the center line of the switchgear for minimizing the kind and number of the conductors interconnecting the circuit breakers.

4 Claims, 8 Drawing Sheets

ENCLOSED SWITCHGEAR

BACKGROUND OF THE INVENTION

This invention relates to an enclosed switchgear in which circuit breaker chambers and conductors interconnecting these chambers are arranged in a simplified manner.

Figure 1:
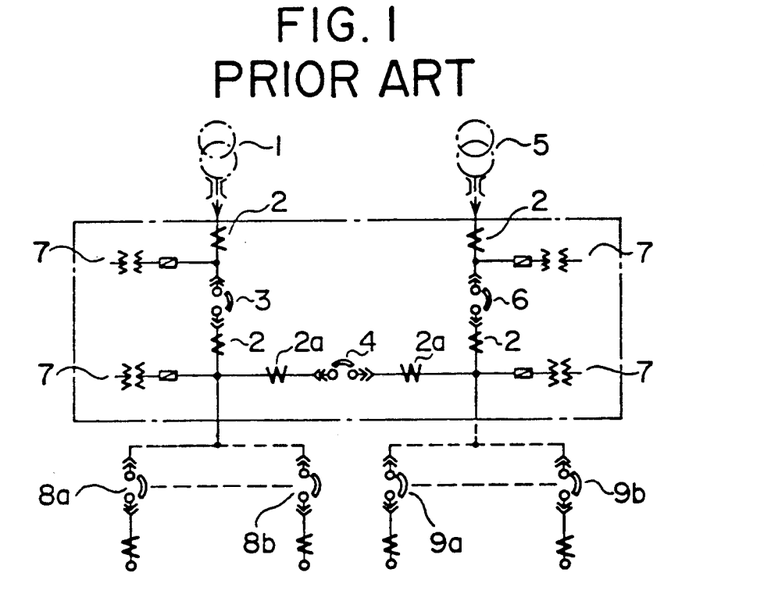
FIG. 1 is a single line diagram showing a conventional switchgear wherein electric power is received from two power line systems.

Among enclosed type switchgears (hereinafter termed power receiving switchgears), there is, for instance, a switchgear as shown in a single line diagram such as shown in FIG. 1, which receives electric power from two separate power line systems. As shown in FIG. 1, the secondary winding of a first power line transformer 1, the primary or high-voltage winding of which is connected to the first power line system, is connected through a current transformer (CT) 2, an air circuit breaker (ACB) 3 and current transformers (CT) 2 and 2a to one terminal of a bus tie air circuit breaker (ACB) 4, all encased in the power receiving switchgear which is indicated by one dot dash line. Likewise, the secondary winding of a second power line transformer 5, the primary or high-voltage winding of which is connected to the second power line system, is connected through a current transformer (CT) 2, air circuit breaker (ACB) 6, and current transformers (CT) 2 and 2a to the other terminal of the air circuit breaker (ACB) 4, also encased in the power receiving switchgear. Potential transformers (PT) 7 are connected to the power source side terminals of the ACBs 3 and 6, and also to both side terminals of the ACB 4. The load side terminals of the ACBs 3 and 6 of the power receiving switchgear are ordinarily connected to feeder circuit breakers (ACBF)8a, 8b and 9a, 9b, respectively, as shown by dash lines.

Figure 2:
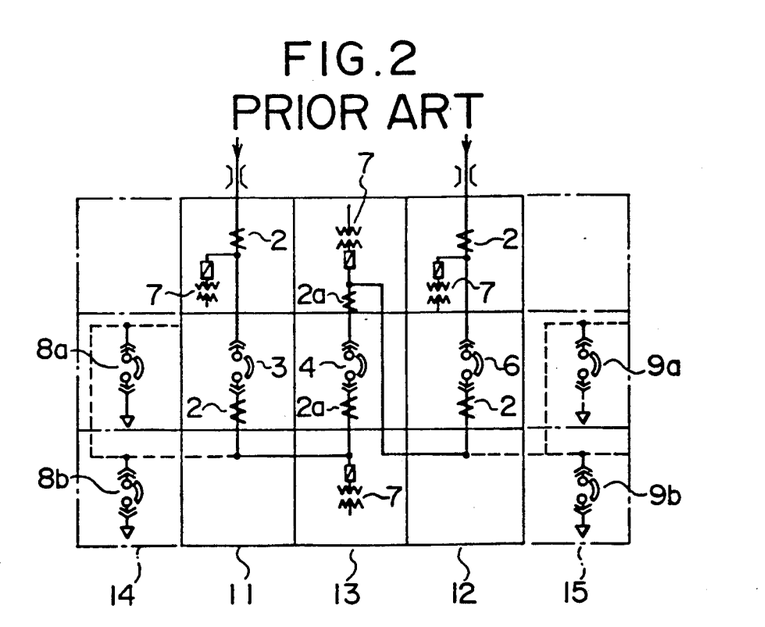
FIG. 2 is a diagram showing a panel arrangement for providing the conventional switchgear.

FIG. 2 is a diagram showing the arrangement of the above described components of the power receiving switchgear. In FIG. 2, the switchgear indicated by a solid line comprises a first power receiving panel 11 provided on the left side, a second power receiving panel 12 provided on the right side, and a bus tie panel 13 provided at the center. Feeder panels 14 and 15 are arranged on the left side and right side of the switchgear as indicated by one-dot dash lines. Each of the panels is divided vertically into three chambers, so that the entire power receiving switchgear includes 9 unit chambers comprising PT unit chambers 11a, 12a, 13a, 13c, circuit breaker unit chambers 11b, 12b, 13b and empty unit chambers 11c and 12c. In the intermediate stage of the first power receiving panel 11 is provided a circuit breaker chamber encasing the ACB 3, while in the intermediate stage of the second power receiving panel 12, there is provided a circuit breaker chamber encasing the ACB 6. In the intermediate stage of the bus tie panel 13, another circuit breaker chamber encasing the ACB 4 is provided. In each of the feeder panels 14 and 15, circuit breaker chambers are provided in the intermediate stage and the lower stage. Potential transformers (PT) 7 are, provided in the upper stage of the first and second power receiving panels 11 and 12, and in the upper and lower stages of the bus tie panel 13, respectively. The conductors connected to the air circuit breakers encased in the circuit breaker chambers are provided, together with the CTs, in a bus chamber provided on the rear side of the power receiving switchgear.

Figure 3:
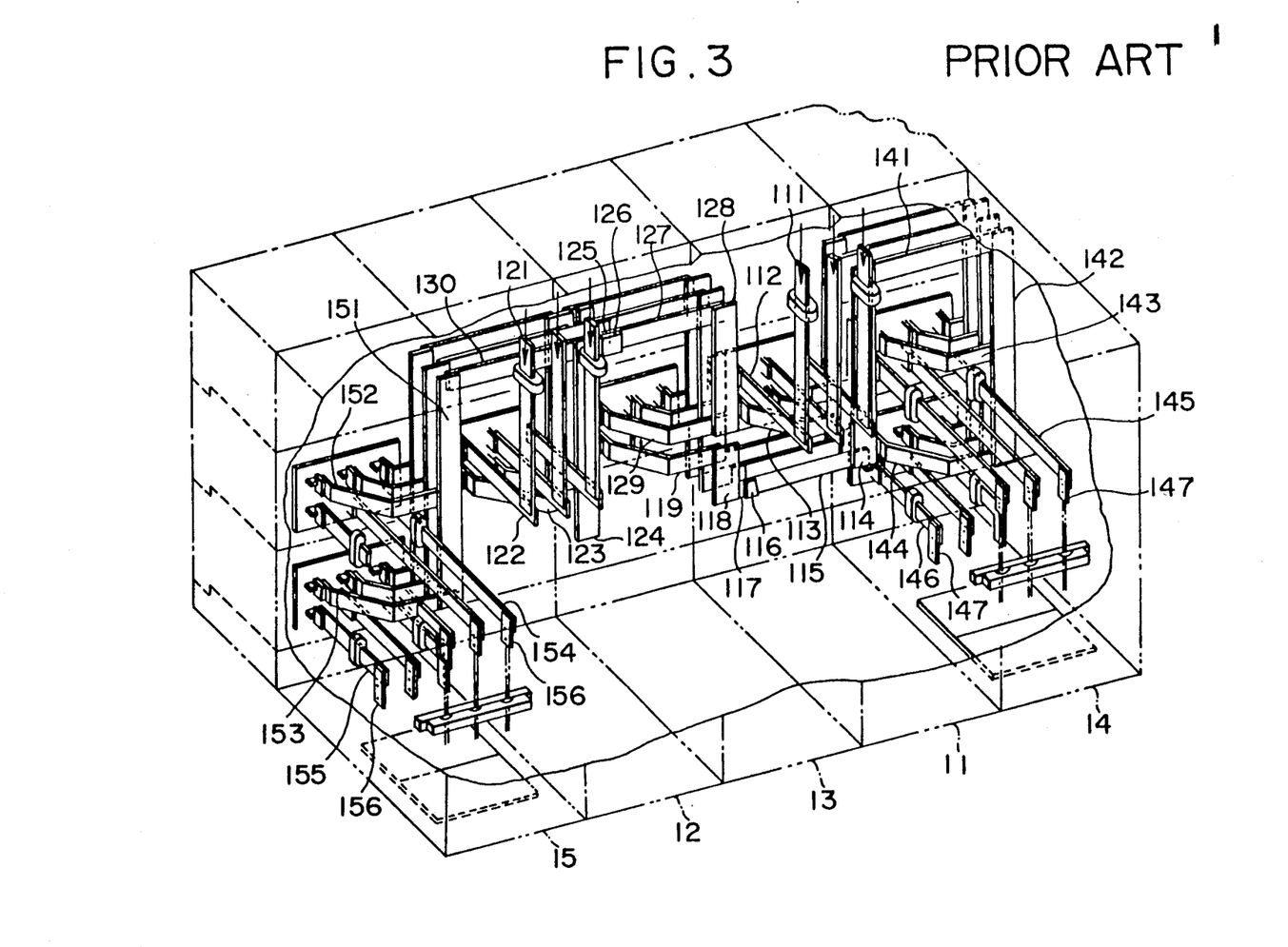
FIG. 3 is a perspective view showing an arrangement of the conductors in bus chambers provided on the rear side of the switchgear shown in FIG. 2.

FIG. 3 is a perspective view showing the bus chamber provided on the rear side of the switchgear. In FIG. 3, the lower ends of conductors 111 connected to the secondary windings of the transformer 1, that receives electric power from the first power line system, are connected with the rear ends of conductors 112 provided on the rear side of the ACB 3, not shown in FIG. 3. The forward ends of the conductors 112 are connected to the upper terminals of the ACB 3. The lower terminals of the ACB 3 are connected to the forward ends of L-shaped conductors 113, the rightward ends of which are connected to intermediate portions of vertically disposed conductors 114. The lower ends of the conductors 114 (see FIG. 4) are connected with the right ends of horizontally disposed conductors 115. The left ends of the conductors 115 are connected to the lower ends of vertically disposed conductors 118 through connecting pieces 116 and 117. The upper ends of the conductors 118 are connected with the right ends of L-shaped conductors 119, the forward ends of which are connected to the lower terminals of the ACB 4, not shown in FIG. 3.

In the same manner, the lower ends of conductors 121, the upper ends of which are connected to the secondary windings of the transformer 5 that receives electric power from the second power line system are connected with the rear ends of conductors 122 disposed forwardly, the forward ends of the conductors 122 being connected to the upper terminals of the ACB 6, not shown in FIG. 3. The lower terminals of the ACB 6 are connected with the forward ends of substantially L-shaped conductors 123, the right ends of which are connected to the lower parts of vertically disposed conductors 124 (see FIG. 4). The upper ends of the conductors 124 are connected through connecting pieces 125 and 126 and conductors 127 to the upper ends of conductors 128 disposed vertically. The lower ends of the conductors 128 are connected to the right ends of substantially L-shaped conductors 129, the forward ends of which are connected to the upper terminals of the ACB 4. The upper ends of the vertical conductors 124 are further connected with the right ends of horizontally disposed conductors 130.

The arrangement of the conductors in bus chambers provided on the rear side of the feeder panels 14 and 15, which are arranged on both sides of the power receiving switchgear, is also indicated in FIG. 3. In the bus chamber provided on the rear side of the feeder panel 14, the left ends of horizontal conductors 141 are connected with the upper ends of the vertical conductors 114, which are connected through the conductors 113, 115, 116, 117, 118 and 119 to the lower terminals of the ACBs 3 and 4. The right ends of the conductors 141 are connected with the upper ends of vertically disposed conductors 142. Right ends of substantially L-shaped conductors 143 and 144 are connected to intermediate portions and the lower ends of the conductors 142. The forward ends of the L-shaped conductors 143 and 144 are connected to the upper terminals of ACBF 8a and ACBF 8b, not shown in FIG. 3, which are provided in the circuit breaker chamber of the feeder panel 14. The lower terminals of the ACBF 8a and ACBF 8b are connected with the forward ends of load side conductors 145 and 146, the rear ends of which are connected with terminal plates 147, respectively.

Likewise, in the bus chamber on the rear side of the feeder panel 15 provided on the left side of the switchgear, the upper ends of vertical conductors 151 are connected to the left ends of the horizontal disposed conductors 130 which are provided in the bus chamber formed on the rear side of the second power receiving panel 12. The right ends of substantially L-shaped conductors 152 and 153 are connected to intermediate portions and lower ends of the vertical conductors 151, respectively. The forward ends of the conductors 152 and 153 are connected to the upper terminals of the feeder circuit breakers ACBF 9a and ACBF 9b, respectively. The forward ends of load side conductors 154 and 155 are connected to the lower terminals of the feeder circuit breakers ACBF 9a and ACBF 9b, respectively, and the rear ends of the load side conductors 154 and 155 are connected with terminal plates 156.

Figure 4:
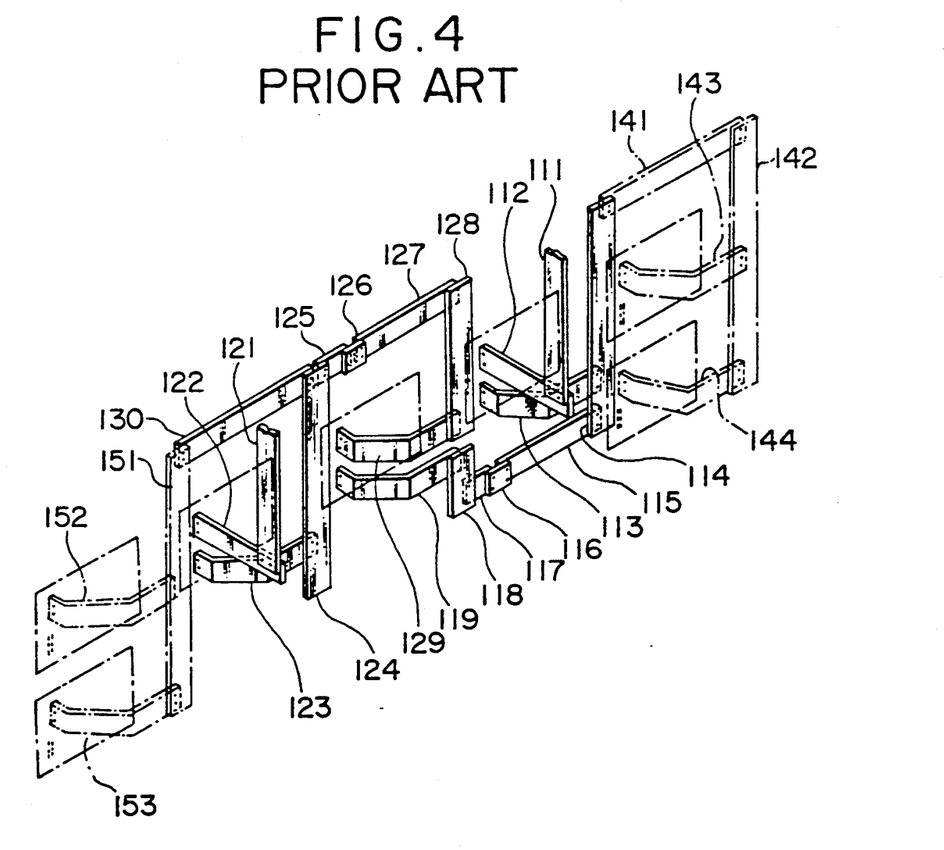
FIG. 4 is a perspective view showing an important part of the conductors thus arranged.

FIG. 4 is a perspective view showing merely T-phase conductors. In FIG. 4, conductors indicated by solid lines are provided within the bus chamber of the power receiving switchgear, while the conductors indicated by dot and dash lines are those provided in the bus chambers of the feeder panels (for simplicity, the load side conductors and the terminal plates provided therein are omitted). As is apparent from FIG. 4, the bus chamber of the power receiving switchgear includes 19 conductors per one phase, that is 57 conductors for three phases.

It has been found that the above described construction of the conventional power receiving switchgear gives rise to following difficulties.

(1) Since, three circuit breakers are encased in three panels, respectively, a large floor area is required for the installation of the switchgear.

(2) Since a large number of units (9 units) are required for encasing the component elements, the manufacture of the box-shaped structure of the switchgear requires a long time fabrication, and furthermore, the increasing of the kind of units requires troublesome assembling of the switchgear.

(3) In the three circuit breaker chambers arranged in a juxtaposed relation, since the upper terminals of a circuit breaker are connected to the lower terminals of another circuit breaker, the number of vertical conductors inevitably increases, thus complicating the arrangement and increasing the numbers, kinds and lengths of the conductors.

(4) Since the number of the conductors increases, the connecting points therebetween also increase. Furthermore, since the length of the conductors becomes long, the amount of heat thereby created increases, thereby causing high temperature rise.

(5) Since the number and kind of the conductors thus increased, the manufacture of the conductors and the assembling of the same become troublesome.

(6) Since the construction and the arrangement of the conductors are complicated, the inspection and maintenance of the switchgear also become troublesome.

SUMMARY OF THE INVENTION

An object of the present invention is to provide an enclosed type switchgear in which the number and kind of unit chambers encasing the component elements are reduced, as well as the number and kind of conductors encased therein, so that the floor area required for the installation of the switchgear is reduced, while the inspection and maintenance thereof are facilitated.

The above described and other objects of the invention can be achieved by an enclosed type switchgear which receives electric power from two power line systems and supplies the electric power to the load side, the switchgear comprising first and second circuit breaker chambers arranged side by side for encasing first and second circuit breakers connected to the two power line systems, respectively, a third circuit breaker chamber provided below the first and second circuit breaker chambers for encasing a third circuit breaker which interconnects load side terminals of the first and second circuit breakers, and bus chambers provided on the rear side of the first, second and third circuit breaker chambers for encasing conductors interconnecting the first, second and third circuit breakers; the first, second and third circuit breaker chambers and the conductors interconnecting the first, second and third circuit breakers being arranged symmetrically with respect to the center line of the switchgear.

With the above described construction, the size of the switchgear can be reduced as well as the number and kind of the conductors, and the production cost of the switchgear can be reduced.

Because of the symmetrical construction and arrangement of the circuit breaker chambers and the conductors, many of the conductors and else can be standardized to be used commonly in different positions.

DESCRIPTION OF THE PREFERRED EMBODIMENT

Figure 5:
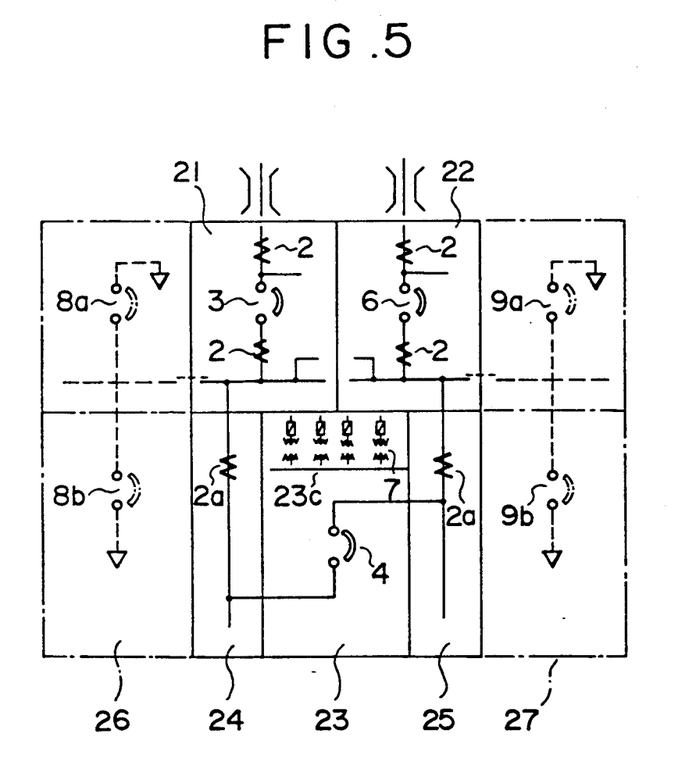
FIG. 5 is a diagram showing a panel arrangement for providing an enclosed type switchgear according to the present invention.

FIG. 5 is a diagram showing a panel arrangement of the preferred embodiment wherein similar members as those in FIG. 2 are designated by similar reference numerals. In the diagram, the power receiving switchgear constituting the preferred embodiment of this invention, which is shown by solid lines, has a front portion divided into upper and lower stages. The upper stage is further divided into circuit breaker chambers 21 and 22 provided on the left and right sides thereof for encasing air circuit breakers ACB 3 and 6, respectively. Likewise, the lower stage of the front portion of the switchgear is divided into a circuit breaker chamber 23 which is provided at the center for encasing an air circuit breaker ACB 4, a PT chamber 23c provided in an upper part of the circuit breaker chamber 23 for encasing PTs, and control circuit chambers 24 and 25 provided on the left and right sides of the circuit breaker chamber 23 and the PT chamber 23c for encasing control circuits. The rear portion of the power receiving switchgear is formed into bus chambers.

As shown in FIG. 5, the lower poles 213 and 223 of the air circuit breakers ACB 3 and 6 are connected to ACB 4 through horizontal buses 214 and 224 extending intermediately of the bus chambers and vertical conductors 215 and 225 and horizontal conductors 216 and 226 that extend through lower parts of the bus chambers on the left and right sides thereof so that the lower poles 213 and 223 of the ACB's 3 and 6 are interconnected by the ACB 4 when the same is closed. Furthermore, the power receiving switchgear is so constructed that it can be connected through horizontal buses to feeder panels 26 and 27 provided on both sides of the switchgear as indicated by one dot dash lines.

Figure 6:
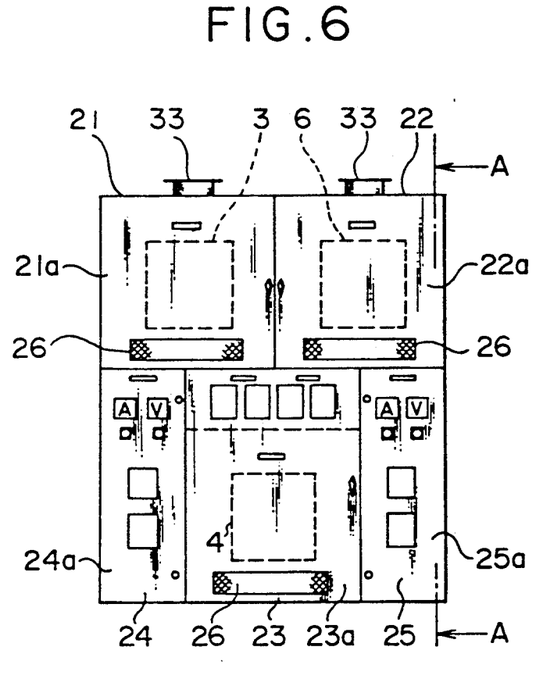
FIG. 6 is a front view of the switchgear shown in FIG. 5.
Figure 7:
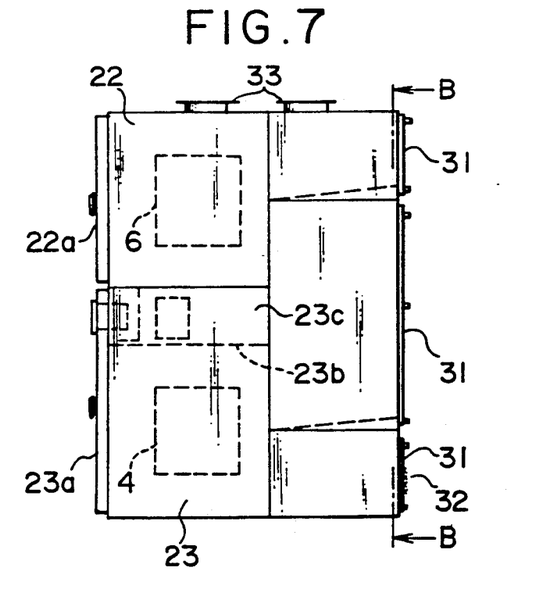
FIG. 7 is a side view of the switch gear shown sectional view taken along line A—A in FIG. 6.

FIGS. 6 and 7 are front and side views of the power receiving switchgear shown in FIG. 5.

As shown in FIGS. 6 and 7, the power receiving switchgear is made of 5 units comprising the circuit breaker chambers 21 and 22 provided on the left side and the right side of the upper stage for encasing ACB 3 and ACB 6, the circuit breaker chamber 23 provided centrally in the lower stage for encasing ACB 4, and the control circuit chambers 24 and 25 provided on the left and right sides of the circuit breaker chamber 23. Since the circuit breaker chambers 21 and 22 and the control circuit chambers 24 and 25 are formed symmetrically with each other, the power receiving switchgear is made of three kinds of units. Doors 21a, 22a, 23a, 24a and 25a are provided forwardly of the chambers 21 through 25, and ventilation parts 28 are provided in the lower parts of the doors 21a, 22a and 23a, respectively.

On the door 23a, there are provided protective relays, while on the doors 24a and 25a, there are provided measuring instruments, change-over switches, and protective relays. The internal space of the circuit breaker chamber 23 is separated vertically by a separating plate 23b so as to form a potential transformer chamber 23c on the upper side of the plate. Another separating plate 23d is provided before the potential transformer 7.

On the rear side of the bus chambers, there are provided rear covers 31 which are separated vertically as shown in FIG. 7. By removing the rear covers, maintenance and inspection of the switchgear can be carried out from the rear side. Suction ports 32 are provided through the rear covers 31 provided in the lower stage, while exhaust ports 33 are provided through the top plates of the circuit breaker chambers 21 and 22 at intermediate portions thereof and also through the top plate of the bus chamber at forward parts thereof.

Figure 8:
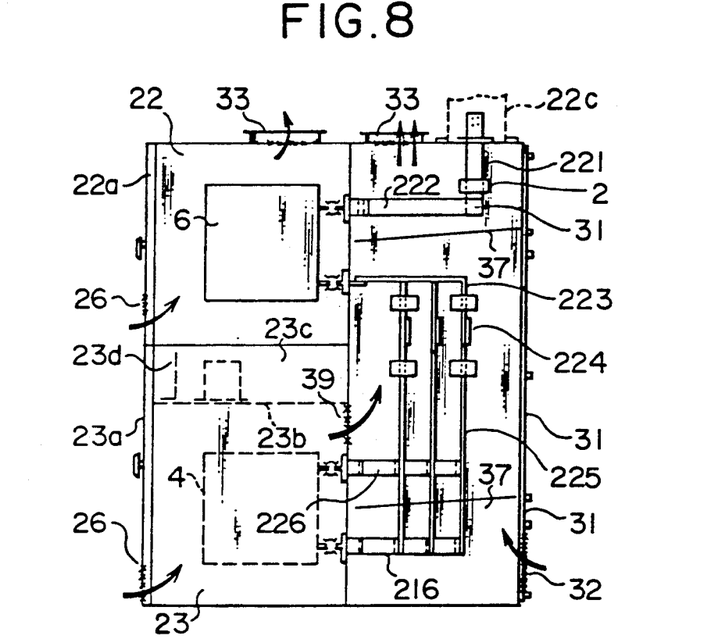
FIG. 8 is a sectional view taken along the line 8—8 in FIG. 6.
Figure 9:
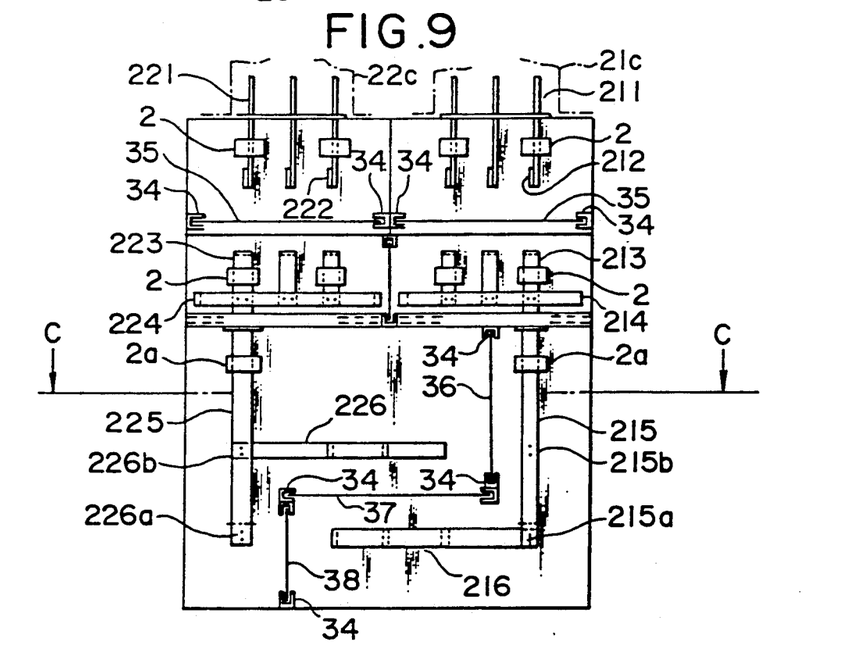
FIG. 9 is a sectional view taken along the line 9—9 in FIG. 7.

As shown by one dot dash lines in FIGS. 8 and 9, first and second bus ducts 21c and 22c are further provided to extend upwardly with the lower ends secured to the top plate of the switchgear. Conductors 211 and 221 connected to the secondary windings of the first and second transformers 1 and 5 (see FIG. 1) are extended vertically through the first and second bus ducts 21c and 22c, respectively. Current transformers (CT) 2 are provided around the lower parts of the conductors 211 and 221. The lower ends of the conductors 211 and 221 are connected with the rear ends of horizontally extending conductors 212 and 222, the forward ends of which are connected with the upper terminals of the air circuit 3a and 6a breakers ACB 3 and 6. The lower terminals 3b and 6b of the air circuit breakers ACB 3 and ACD 6 are connected with the forward ends of L-shaped conductors 213 and 223. Current transformers CT 2 are mounted on the lower parts of the conductors 213 and 223. Lower ends of the conductors 213 and 223 are connected with horizontal buses 214 and 224, respectively. The conductors from 211 to 214 and the conductors from 221 to 224 are formed to be symmetric with each other. The horizontal buses 214 and 224 are connected with the upper ends of conductors 215 and 225 which extend vertically through both sides portions of the bus chambers toward the lower terminals 4b in FIG. 8 of the ACB 4. Current transformers CT 2a are mounted on intermediate portions of the vertical conductors 215 and 225. The lower ends of the rightward conductors 215 are connected with the right ends of L-shaped conductors 216, the forward ends of which are connected to the lower terminals of the ACB 4. Likewise, intermediate portions of the leftward conductors 225 are connected with left ends of L-shaped conductors 226 similar to the conductors 216, while the forward ends of the conductors 226 are connected to the upper terminals 4a in FIG. 8 of the ACB 4.

At the connecting portion between the conductors 215 and 216, a hole 215a is provided to pass a clamping bolt or screw. At the lower end of each conductor 226, similar dummy hole 226a is provided at a position corresponding to that of the hole 215a. Likewise, a dummy hole 215b is provided intermediately of each conductor 215 at a position corresponding to that of a hole 226b provided for connecting the conductors 225 and 226, so that the conductors 215 and 216 are formed into a similar configuration.

Accordingly the conductors 211 through 216 which connect the ACB 3 provided on the right side with the ACB 4 located in a lower part in FIG. 9 are quite similar to the conductors 221 through 226 which connect the ACB 6, not shown, provided on the left side with the ACB 4.

Figure 10:
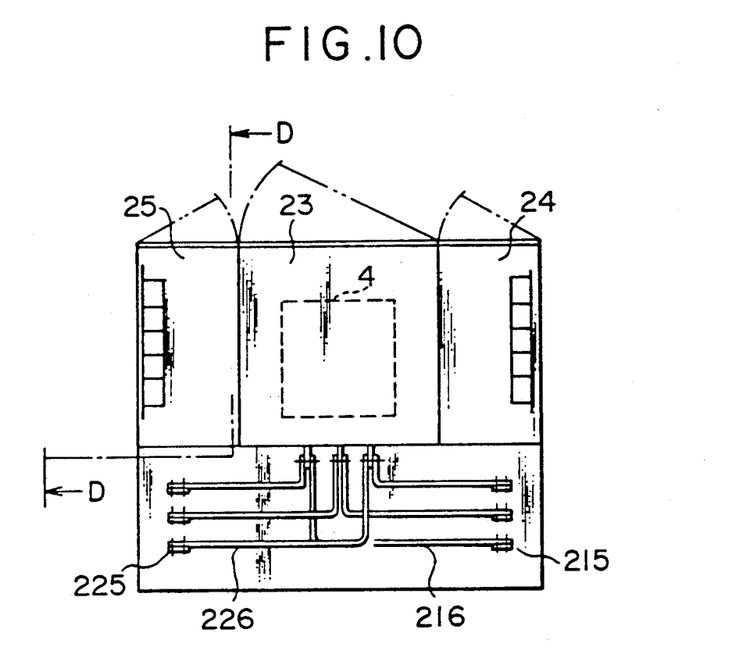
FIG. 10 is a sectional taken along the line 10—10 in FIG. 9.

FIG. 10 is a view taken along the line 10—10 in FIG. 9, which indicates the symmetric construction and arrangement of the conductors 216 and 226.

Figure 11:
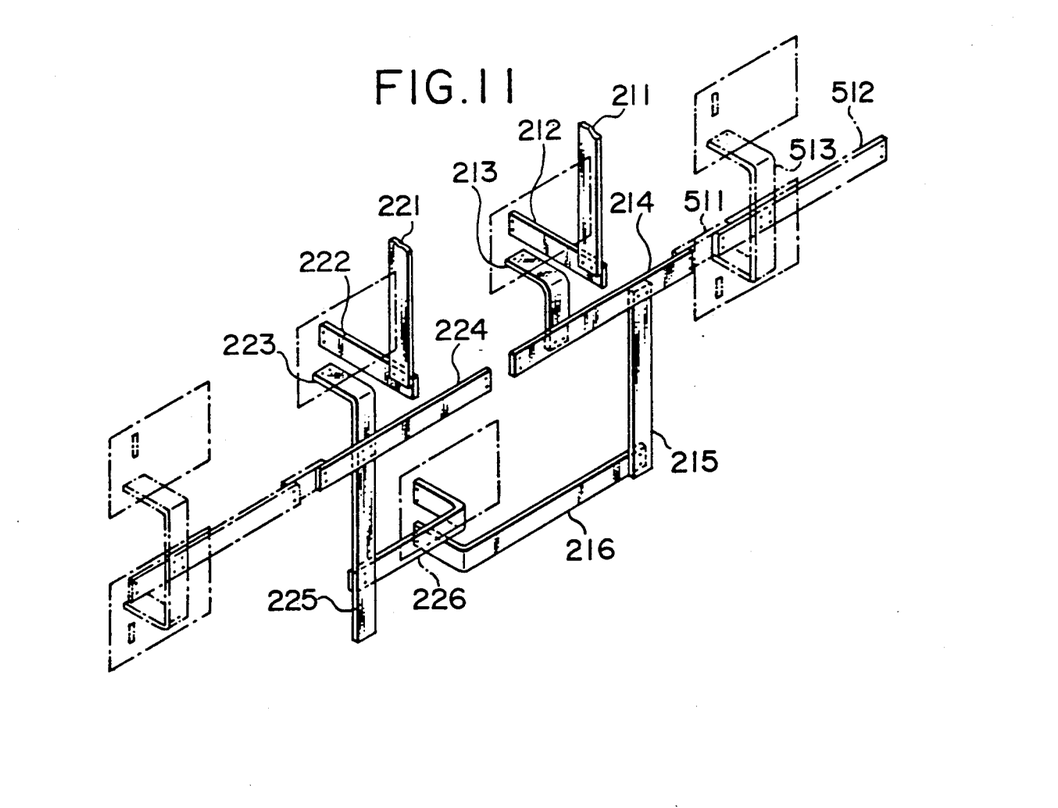
FIG. 11 is a perspective view corresponding to FIG. 4, and showing an important part of the conductors arranged in the bus chambers of the switchgear according to this invention.

FIG. 11 is a perspective view showing merely T-phase conductors among those shown in FIGS. 8 through 10. As is apparent from FIG. 11, the power receiving switchboard indicated by solid lines includes 12 T-phase conductors, 211-216 and 221-226 that is, 36 conductors for three phases. Among these conductors, since the conductors 216 and 226 are of different configurations according to different phases as shown in FIG. 10, altogether eight kinds of conductors are contained in the switchgear.

Furthermore, as shown in FIGS. 8 and 9, guide rails 34 of a U-shaped cross-section are provided along the side walls and also along an intermediately provided separating plate between the bus chambers located on the rear side of the ACB 3 and ACB 6, such that the guide rails 34 extend forwardly and backwardly while tapering forwardly downwardly. Separating plates 35 having ventilation holes therethrough are inserted from the rear side of the switchgear along the guide rails 34. Likewise, a pair of guide rails 34 having a channel-shaped cross-section are provided between the conductor 215 and 226 at vertically upper and lower positions, so that the guide rails 34 extend forwardly and backwardly. A vertical separating plate 36 is inserted from the rear side of the switchgear along the guide rails 34. Between the conductors 216 and 226, and also between the conductors 216 and 225, there are further provided guide rails 34 of a similar construction, and a horizontally extending separating plate 37 and a vertically extending separating plate 38 are inserted along the guide rails 34, respectively.

As shown in FIG. 8, a ventilation hole 39 is provided through a plate on the rear side of ACB 4 in an upper part thereof, so that air becoming hot in the circuit breaker chamber 23 is forced by cool air entering the chamber from the suction port 26 to be exhausted through the ventilation hole 39 into the bus chambers. The air in the bus chambers thus heated is further forced upwardly by cool air entering the bus chambers through the suction ports 32 to be exhausted to the outside of the switchgear through the exhaust ports 33 provided through the top plate of the bus chambers. Furthermore, the air heated in the circuit breaker chambers 21 and 22 is forced by each air entering the chambers through suction ports 26 provided through the doors 21a and 22a to be exhausted outside through the exhaust ports 33 provided through the top plates of the circuit breaker chambers.

Figure 12:
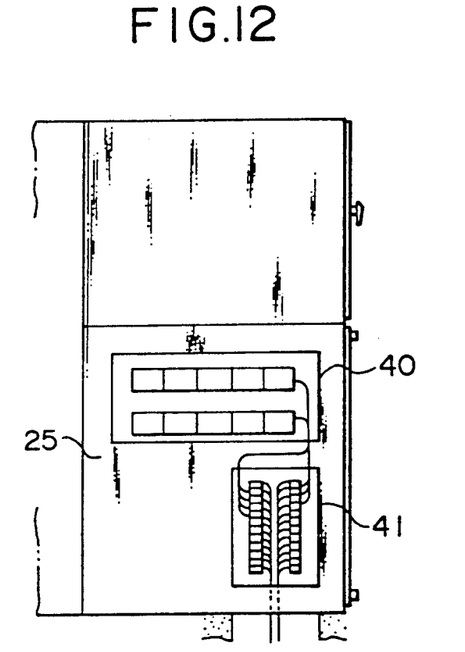
FIG. 12 is a sectional view taken along the line D—D in FIG. 10.

FIG. 12 is a sectional view along the line 12—12 in FIG. 10. As shown in FIG. 12, a mounting plate 40 is secured to a side plate of the second control circuit chamber 25. Instruments used in the second control circuit are mounted on the mounting plate 40. A terminalboard mounting plate 41 is secured to a lower part of the side plate for mounting terminalboards, on which control cables coming from outside are connected with control wires in the switchgear.

Figure 13:
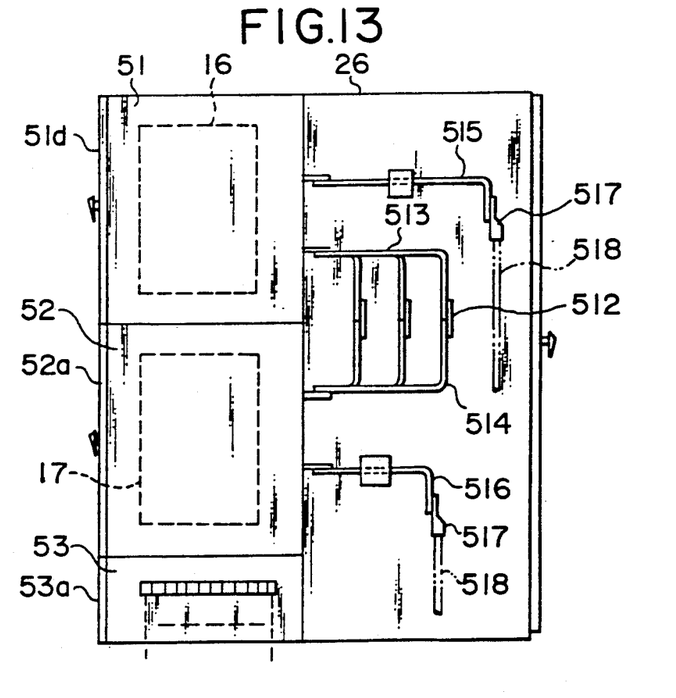
FIG. 13 is a side view, partly in section, showing a construction of feeder panels provided on both sides of the switchgear of this invention.

FIG. 13 illustrates one example of the feeder panel 26 provided on one side of the power receiving switchgear. The front portion of the example is divided into three chambers 51, 52 and 53. The upper chamber 51 encases the circuit breakers ACBF 8a, the intermediate chamber 52 encases the circuit breakers ACBF 8b, and the lower chamber 53 encases control circuit elements. Doors 51a, 52a and 53a are provided on the front side of these chambers. A terminal board is provided in the lower chamber 53 for connecting out-going cables to internal wires. The rear portion of the feeder panel 26 is formed into a bus chamber.

As shown in FIG. 11 in the bus chamber, conductors are arranged as follows. Horizontally extending buses 512, which are connected to the horizontal buses 214 of the power receiving switchgear through connecting pieces 511, are provided in an intermediate portion of the bus chamber. The horizontal buses 512 are connected through L-shaped conductors 513 and 514, which are disposed symmetrically, to the lower terminals of the ACBF 8a arranged in the upper stage and to the upper terminals of the ACBF 8b arranged in the intermediate stage. The other terminals of the ACBF 8a and ACBF 8b are connected to load side conductors 515 and 516. Press-formed terminals 517 attached to load side cables 518 are secured to the rear ends of the conductors 515 and 516. In the bus chamber of the feeder panel 27 provided on the other side of the switchboard, the conductors are arranged in the same manner as described above as shown in the left part of FIG. 11.

What is claimed is:

1. An enclosed type switchgear which receives electric power from two power lines and supplies electric power thus received to a load side, comprising:

first and second circuit breaker chambers which are in direct contact with each other at side surfaces thereof, said first and second circuit breaker chambers respectively encasing first and second circuit breakers connected to said power lines;

a third circuit breaker chamber having an upper surface thereof in contact with bottom surfaces of said first and second circuit breaker chambers, said third circuit breaker chamber having a center of the upper surface thereof located at a contact point between said first and second circuit breaker chambers, said third circuit breaker chamber encasing a third circuit breaker which is connected to lower terminals of said first and second circuit breakers; and bus chambers provided on the rear side of said first, second and third circuit breaker chambers encasing conductors interconnecting said first, second and third circuit breakers.

2. An enclosed type switchgear according to claim 1 which further comprises control circuit chambers, provided on both sides of said third circuit breaker chamber so as to encase control circuits including measuring instruments, transfer switches and protective relays, and a potential transformer chamber provided in an upper part of said third circuit breaker chamber so as to encase potential transformers.

3. An enclosed type switchgear according to claim 1 wherein, in said bus chambers provided on the rear side of said first and second circuit breaker chambers, upper terminals of said first and second circuit breakers are separated from lower terminals and horizontal buses connected to said lower terminals, by a separating plate extending between said upper terminals and said lower terminals, and in one of said bus chambers provided on the rear side of said third circuit breaker chamber, conductors connected to upper terminals of said third circuit breaker are separated from conductors connected to lower terminals of said third circuit breaker by additional separating plates extending vertically and horizontally therebetween.

4. An enclosed type switchgear according to claim 1 further comprising means connecting said enclosed type switchgear with at least one feeder panel through horizontally extending buses connected to said lower terminals of said first and second circuit breakers.

* * * * *